Nov. 11, 1930.  L. S. HARBER  1,781,546
DOUGH MOLDING MACHINE
Filed April 9, 1925  3 Sheets-Sheet 3
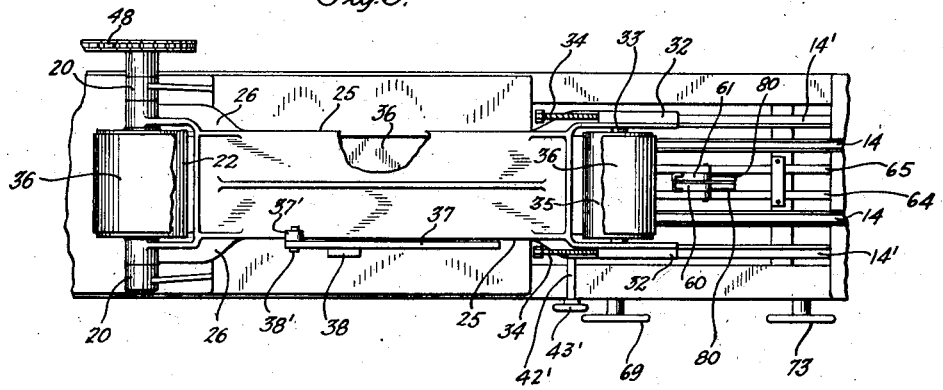
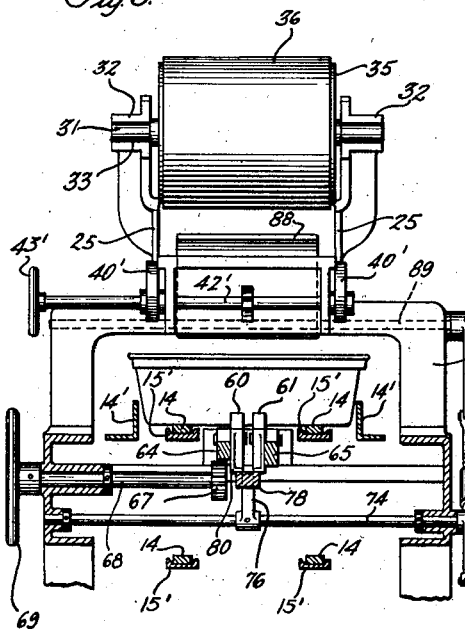
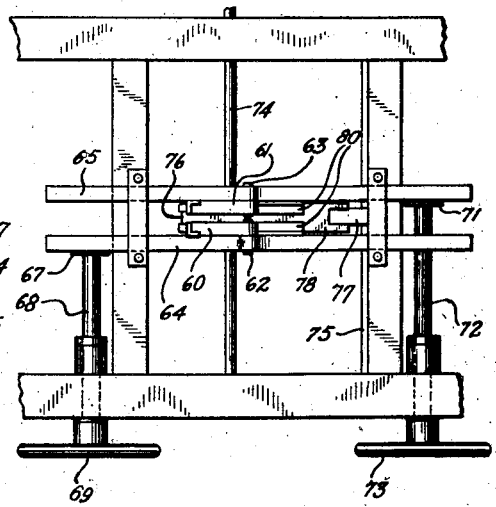
INVENTOR
Laurence S Harber
BY
ATTORNEYS Patented Nov. 11, 1930

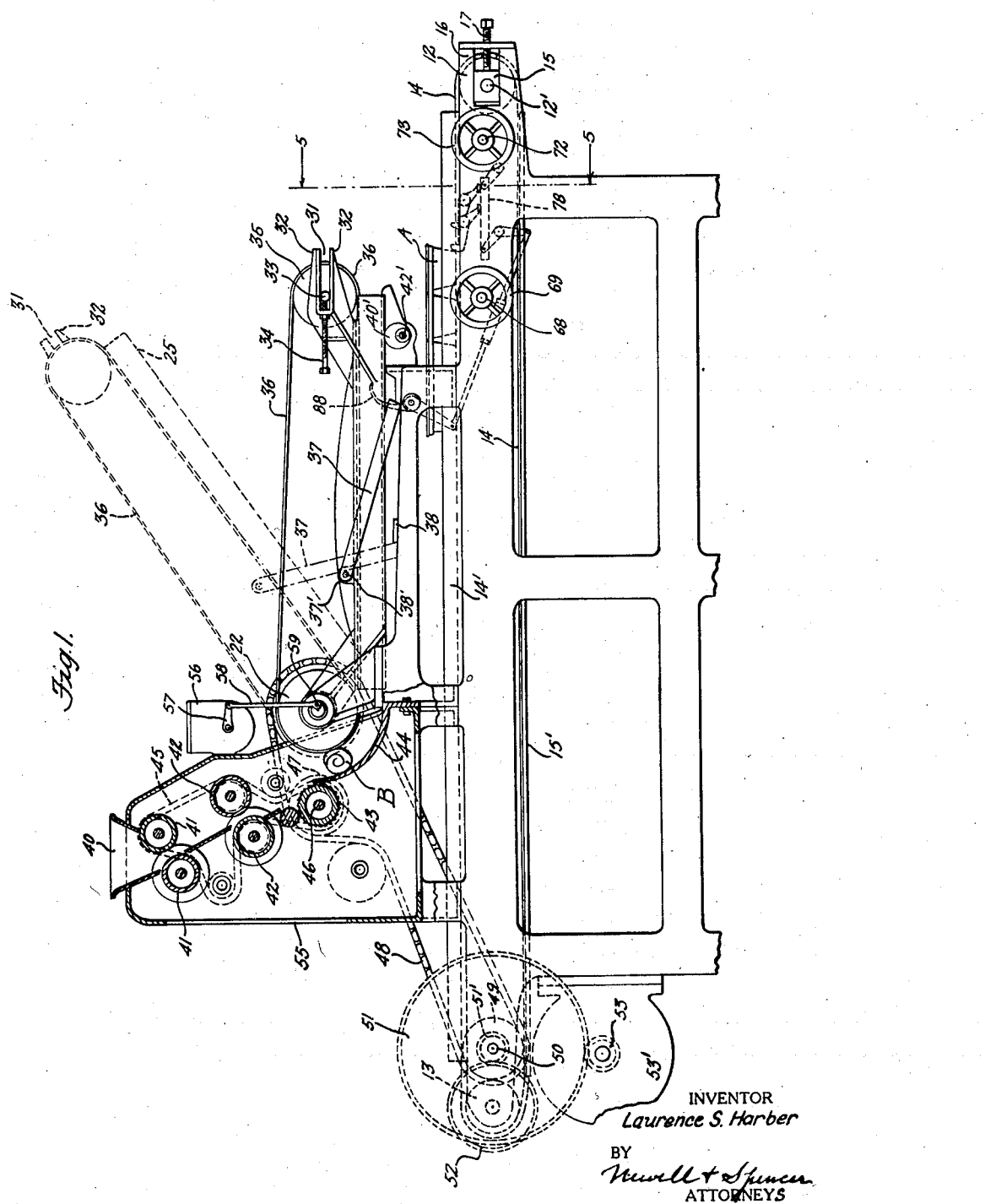

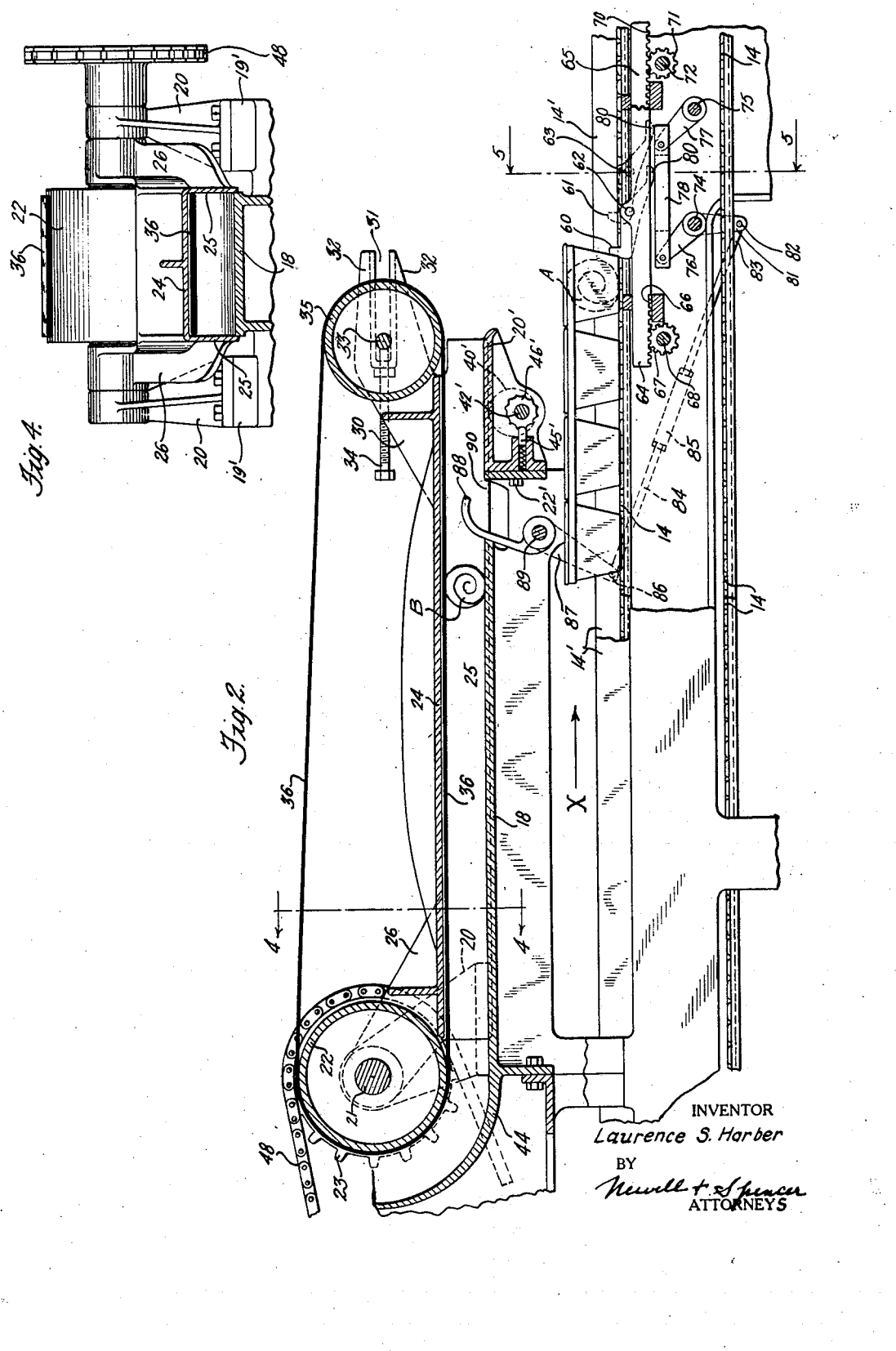

1,781,546

UNITED STATES PATENT OFFICE

LAURENCE S. HARBER, OF SAGINAW, MICHIGAN, ASSIGNOR, BY MESNE ASSIGNMENTS, TO BAKER PERKINS COMPANY, INC., OF SAGINAW, MICHIGAN, A CORPORATION OF NEW YORK

DOUGH-MOLDING MACHINE

Application filed April 9, 1925. Serial No. 21,763.

This invention relates to new and useful improvements in machines for molding dough, and it pertains more particularly to a machine for molding dough into loaf form.

One object of the invention is to improve the construction and mode of operation of various parts of dough molding machines with a view of increasing the efficiency of such machines.

With the above and other objects in view reference is had to the accompanying drawings in which—

Fig. 1 is a view, partly in elevation and partly in longitudinal section of a machine constructed in accordance with the present invention;

Fig. 2 is an enlarged longitudinal sectional view of the load molding mechanism of the machine, parts being broken away to show the pan feeding mechanism and the structure employed for adjustment thereof relative to the discharge of the loaf molding mechanism;

Fig. 3 is a detail plan view, partly in horizontal section of the loaf molding mechanism;

Fig. 4 is a detail vertical sectional view, taken on the line 4—4 of Fig. 2;

Fig. 5 is a detail vertical sectional view taken on the line 5—5 of Fig. 2; and

Fig. 6 is a plan view of a portion of the pan feeding mechanism.

The machine illustrated in the accompanying drawings includes a dough rolling mechanism, a loaf molding mechanism, and a pan feeding mechanism, and the dough is operated upon in this machine in the sequence mentioned; that is, a piece of dough is rolled into spiral form, after which it is shaped into loaf form, and subsequently deposited in pans which are automatically moved to position to receive the loaf forms from the loaf molding mechanism.

In order to deliver the pieces of dough to the rolling mechanism, a hopper 40 is provided, which hopper is suitably mounted in the top wall of a housing 55. Mounted adjacent the discharge end of this hopper 40, there are two sheeting rolls 41 which receive the piece of dough from the hopper and form it into a sheet in passing therebetween to the two sheeting rollers 42.

The sheet of dough is next passed between the sheeting rollers 42 which reduce the thickness of the sheet, and from these sheeting rollers 42 the sheet is presented to a roller 43, the surface of which is fluted for the purpose of rolling the sheet into spiral form, as designated by the reference character B. This fluted roller 43 is mounted upon a shaft 46 which carries a driving sprocket 47.

After the piece of dough has been rolled into spiral form, it is delivered from the fluted roller 43 to a compression apron 44, and said piece of dough is moved along the compression apron 44 by a suitable impelling means in the form of a conveyor apron or belt 36 which at this point is concentric with the compression apron 44. This conveyor apron or belt 36 passes around two rollers 22 and 35. The roller 22 is carried by a shaft 21, which shaft 21 is mounted in brackets 20, and the brackets 20 are in turn carried by the side wings 19' of a molding table 18. As clearly shown in Figure 2, the molding table forms a continuation of the compression apron 44.

Pivotally mounted upon the shaft 21 there is a frame member or pressure plate 24 along the under side of which the conveyor apron 36 closely runs, and which has depending side flanges 25 which are adapted, as shown in Fig. 4, to embrace the molding table 18. The roller 35, heretofore mentioned, is carried by a shaft 33, and said shaft 33 is mounted in the space 31 between the furcations 32 of the bifurcated arms 30, carried by the free end of the frame member or pressure plate 24. To provide for adjusting the tension of the conveyor apron or belt 36, bolts 34 are provided, and said bolts engage the shaft 33 to determine its position in the bifurcated arms 30.

In the present form of the invention the frame member or pressure plate 24 is provided, upon the end adjacent to that in which the roller 22 is mounted, with the arms 26. Shaft 21 passes through these arms 26 and serves to pivotally mount the frame member or pressure plate 24 and permit pivotal movement thereof about the shaft 21.

By this construction it will be apparent that the conveyor apron or belt 36 is carried by the frame member or pressure plate 24, and is movable therewith toward and from the molding table 18. It will also be apparent that the pressure plate and belt may be supported by a piece of dough in its passage between the molding table and belt so that the weight of the pressure plate and associated parts exerts a yielding pressure on the dough. The frame member or pressure plate 24 is capable of movement to the position in which it is shown in dotted lines in Fig. 1, for the purpose of giving ready access to the molding table and also to the run of the belt opposite the table so that these parts may be thoroughly and efficiently cleaned. When the frame member or pressure plate 24 is moved to the position shown in dotted lines it may be retained or supported in said position by means of a prop 37, pivotally mounted as at 38' upon a lug 37' carried by the frame member or pressure plate 24, and the free end of this prop is adapted to rest upon the frame of the machine and engage behind a suitable stop 38 as shown in Fig. 1 in dotted lines.

The shaft 21 is provided with a sprocket 23 and passing around said sprocket 23 there is a driving chain 48 which serves to drive the roller 22, and the conveyor apron or belt 36.

As more clearly shown in Fig. 1, this chain passes around a sprocket 49 carried by the shaft 50, upon which is mounted a gear 51. This gear 51 meshes with a gear 53 carried by the shaft of a suitable motor 53'. At a point between the sprocket 23 and the sprocket 49 this chain 48 engages the sprocket 47, heretofore mentioned as carried by the shaft 46, to drive the fluted roller 43, and through the medium of a suitably arranged chain 45 the rollers 41 and 42, heretofore mentioned are driven from said roller.

To prevent the pieces of dough from adhering to the conveyor apron or belt 36, the compression apron 44, and the molding table 18, the belt is dusted with flour at a point where it passes around the roller 22. In the form of the invention illustrated, this is accomplished by means of a hopper 56 in which a suitable agitating means, not shown in detail, is mounted and operated by the arm or lever 57. Pivotally connected to the arm or lever 57, there is a link 58 which is pivotally connected at 59 to the shaft 21 so that upon each revolution of the shaft 21, the agitator within the hopper 56 will be operated to cause a discharge of flour therefrom onto the conveyor apron or belt 36.

It will be noted by reference to Figs. 1 and 2, that the discharge end of the molding table 18 is formed by a tailpiece 20' secured to the body of the molding table by means of bolts 22'. Mounted in the tailpiece 20' there is a shaft 42', and said shaft has secured thereto supporting elements for the frame member or pressure plate 24 in the form of cams 40', which engage the lower edges of the side flanges 25 of the frame member or pressure plate 24 to limit the downward movement thereof. To retain these elements in adjusted position, a serrated disc-like member 46' is mounted upon the shaft 42' and adapted for engagement with the serrations of said serrated member 46' there is a spring pressed dog 45'. By this means it is obvious that movement of the frame member or pressure plate 24 in the direction of the molding table 18 may be adjustably limited to determine the ultimate minimum diameter of the loaf, the frame member or pressure plate and belt being supported by the piece of dough operated upon until such time as the dough may be compressed to a point where the side flanges 25 engage the cams 40'.

In the type of machine illustrated in this application, a plurality of pans A are adapted to travel beneath the tailpiece 20' for the purpose of receiving the dough pieces in molded form. These pans A are moved beneath the tail piece 20' in the direction of the arrow X (Fig. 2) by means of conveyors in the form of chains 14 upon which the pans rest, the pans A being guided in their movement by the rail members 14', between which they travel. These pan conveyors travel through channels 15' which prevent sagging thereof, this construction being shown in Fig. 5. The pan conveyors 14 pass around suitable sprocket wheels 12 at one end of the machine and around sprocket wheels 13 at the opposite end of the machine. The sprocket wheels 13 are driven from the shaft 50 by means of a gear 51' which meshes with the gear 52 carried by the shaft upon which the sprocket wheels 13 are mounted. The sprocket wheels 12 are mounted on a shaft 12' and this shaft 12' is in turn mounted in blocks 15 which are slidably mounted in the frame of the machine, said frame being bifurcated as at 16 for the reception of said blocks 15. To maintain the blocks 15 in adjusted position for the purpose of regulating the tension of the pan conveyors 14, bolts 17 are employed which bolts engage the blocks 15 to move them in their mounting.

In order that the pans may be arrested in the proper position to receive the molded pieces of dough, pivoted pawls 60 and 61 are provided. These pawls have the same general mode of operation as those shown and described in my patent for Pan filling machine, No. 1,633,014, June 21, 1927. The pawls 60 and 61 are adjustable with relation to the discharge end of the molding table, and also with relation to each other, and to provide for this adjustment the pawl 60 is pivotally mounted as at 62 on a reciprocatory bar 64, while the pawl 61 is pivotally mounted as at 63 on a reciprocatory bar 65. To provide for moving the bar 64, teeth 66 are formed on a portion of the lower edge thereof and said teeth 66 are adapted to mesh with a gear 67 carried by a transversely extending shaft 68 which has a hand wheel 69 by means of which it may be rotated. The bar 65 to which the pawl 61 is pivoted is likewise provided on its lower edge with teeth 70 adapted to be engaged by the gear 71, mounted upon a transversely extending shaft 72, which shaft has a hand wheel 73, by means of which it may be rotated.

It is obvious that this construction permits of independent operation of the reciprocatory bars 64 and 65 and provides for an adjustment or variation of the space between the pawls 60 and 61.

As more clearly shown in Figs. 2 and 5, the pawls 60 and 61 normally occupy a position in the path of travel of the pans A and said pans are adapted to engage the pawls to arrest movement of the pans to permit the pan conveyors 14 to pass thereunder without movement of the pans.

The pawls 60 and 61 are normally maintained in the path of travel of the pans A by the action of gravity and each of the pawls 60 and 61 has an extension 80 resting upon the vertically movable bar 78. As more clearly shown in Fig. 5, for supporting the bar 78 and for giving it its vertical movement, a lever 76 is provided. This lever 76 is mounted upon a transversely extending shaft 74 and the bar 78 is pivotally connected to the upper end thereof. The opposite end of the bar 78 is pivotally connected to the lever 77 and this lever 77 is supported upon a transversely extending shaft 75, so that by reason of the pivotal connection between bar 78 and the levers 76 and 77, said levers will be operated simultaneously.

For operating the bar 78 a trip 88 is provided. This trip 88 is pivotally mounted upon a transversely extending shaft 89 and projects upwardly through an opening 90 in the discharge end of the molding table 18 in such a manner that its upper end lies in the path of travel of the pieces of dough being molded as the same are moved along the molding table. The trip 88 has a lever extension 87, and pivotally connected thereto as at 86 there is a rod 84. Pivotally connected as at 82 to a lever 81 carried by the shaft 74 there is a rod 83, and this rod 83 is connected to the heretofore mentioned rod 84 by means of a turn buckle 85. This construction provides an adjustment by which the extent to which the pawls 60 and 61 project upwardly with relation to the pan conveyors 14 may be determined.

By this construction, it is apparent that, as the pans are moved to the position shown in Fig. 2, the pan conveyors pass freely thereunder without movement of the pans.

With the parts in the position shown in Figs. 2 and 3, that pan farthest to the right in Fig. 2 has received a molded loaf from the delivery end of the molding table 18, the pans having been arrested in their movement by the pawls 60 and 61 which occupy positions alongside of each other, as shown in Fig. 3. As the loaf B, shown in Fig. 2, engages and depresses the trip 88, the pawls 60 and 61 will be depressed and permit the pan conveyors to move the next succeeding pan to position with respect to the delivery end of the molding table to receive the loaf B as it is discharged therefrom. As the loaf B passes the trip 88, the bar 78 is depressed and the acting ends of the pawls rise. When the pan containing the loaf has passed the acting ends of the pawls, the pawls engage the next succeeding pan and hold the same in position to receive the loaf which has just passed the trip 88. This operation is successively carried out as long as the loaves of dough are fed through the machine.

The foregoing is the operation when single loaf pans are employed. When double loaf pans are employed, the pawl 61 is adjusted to a position such as that shown in dotted lines in Fig. 2 by means of the shaft 72, and its hand wheel 73. With the several parts in this position, upon operation of the trip 88, both pawls will be depressed. Immediately after a loaf of dough B passes the trip 88, the bar 78 is depressed allowing the acting ends of the pawls to rise. The pawl 61 will then be elevated into position to engage the forward face of the pan containing a loaf and will hold the same in position to receive a second loaf, the pawl 60 then engaging the bottom of the pan.

When the next loaf engages the trip 88, the acting ends of the pawls will be depressed to release the filled pan and after the loaf passes the trip, the acting ends of the pawl 60 will be elevated into position to engage the succeeding pan, and will hold the same in position to receive said loaf. This cycle of operations is repeated continuously during the operation of the machine.

From the foregoing it is apparent that the adjustability of the pawls 60 and 61 permits of the use of varying types of bakers' pans employed in the art.

Having described my invention, what I claim as new is:

1. In a dough molding machine of the kind described, in combination a stationary table forming the bottom of a molding channel, a pressure belt forming the top of the latter and traveling from its inlet to its outlet, an opening extending near the latter across the said table, a shaft rotatably mounted underneath the latter in a stationary support, a trip fixed to said shaft, extending upwards through the said opening for its length and closing it, when pressed down by a loaf passing along the said molding channel, a pan conveyor located beneath the said table and carrying the pans to be filled underneath the discharge end thereof, a pawl adapted to arrest the pans and to keep them stationary on the said conveyor, a lever and link mechanism connected to said shaft and to said pawl, keeping by its weight the said trip and the said pawl in their upright position, and adapted when its weight is overcome by the pressure of a loaf passing over said trip and the latter is thereby lowered, to lower said pawl simultaneously therewith, and thus to cause by the release of said pawl a forward movement of the pans on said pan conveyor and a turn buckle provided in a link of said lever and link mechanism for adjusting the distance at which the top of the said pawl extends above the bottom of the pans.

2. In a dough molding machine of the kind described, in combination a stationary table forming the bottom of a molding channel, a pressure belt forming the top of the latter and traveling from its inlet to its outlet, an opening provided near the latter in the said table, a trip extending upwards through the said opening, a pan conveyor located beneath the said table and carrying the pans to be charged underneath the discharge end thereof, guides arranged along the sides of said conveyor to guide the pans carried thereon, pawls adapted to arrest the pans and to keep them stationary on the said conveyor while running, a lever and link mechanism connected to said trip and to said pawls and keeping by its weight the said trip and the said pawls in their upright position, while lowering the latter and thus causing a forward movement of the pans on the said conveyor when the said trip is depressed by the pressure thereon of a loaf passing over the same, and a rack mechanism for each of the said pawls for adjusting their position with relation to each other and with relation to the discharge end of said table.

3. In a dough molding machine of the kind described, in combination a stationary table forming the bottom of a molding channel, a support for the same, a roller, a shaft revolubly mounted in the said support above that end of the said table forming the inlet of the molding channel and having the said roller affixed thereto, a second roller arranged at the opposite end of said table, a traveling belt stretched over the said two rollers and forming the top of the molding channel, a pressure plate extending between the two rollers so that the lower flight of the said belt runs along the underside thereof, brackets extended at one end from the said pressure plate and pivotally mounted on the said shaft carrying the first named roller, brackets extending at the opposite end from the said plate and revolubly carrying a shaft on which the said second roller is fixed, flanges depending from each side of said pressure plate and forming the side walls of the molding channel, a shaft revolubly mounted in the said support underneath the said table at some distance from its discharge and located underneath the said second roller, a handle provided on this shaft, two cams fixed on the same shaft, one underneath the bottom edge of each of said flanges so that by turning the said handle the height of the molding channel, when empty, and thereby the limit, to which loaves passing through the molding channel can be compressed therein, can be readily adjusted and means for retaining the said cams in their adjusted position.

Signed at Saginaw, Mich., this 6th day of April, 1925.

LAURENCE S. HARBER.